United States Patent [19]
Stuart et al.

[11] Patent Number: 5,378,006
[45] Date of Patent: Jan. 3, 1995

[54] SLIDER SUSPENSION FOR SEMI-TRAILERS

[75] Inventors: John W. Stuart, Springfield; Donald D. Critten, Gallatin, both of Mo.

[73] Assignee: Reyco Industries, Inc., Springfield, Mo.

[21] Appl. No.: 94,219

[22] Filed: Jul. 21, 1993

[51] Int. Cl.[6] .............................................. B62D 53/06
[52] U.S. Cl. ................................. 280/149.2; 280/796; 280/800
[58] Field of Search ..................... 280/149.2, 296, 797, 280/799, 800

[56] References Cited

U.S. PATENT DOCUMENTS

| | | | |
|---|---|---|---|
| 1,306,822 | 6/1919 | Krafve | 280/796 |
| 1,493,736 | 5/1924 | Collins | 280/796 |
| 4,838,578 | 6/1989 | Baxter | 280/149.2 |

OTHER PUBLICATIONS

Hutchens Ind. Inc., H-8200 Slider Series.
Binkley, Lite-Slide . . . for Air Ride Suspensions on Van Trailers, 1988.
Neway Trailer Air Suspensions.
Hutchens Industries "How About Taking on a Pack of Gators".
Hutchens Ind. Inc., "From the World's Leading Slider Manufacturer" H-8800.
Reyco Transpro Model 86, Model 88.
"The slider", Reyco Transpro.

Primary Examiner—Kenneth R. Rice
Attorney, Agent, or Firm—Dorn, McEachran, Jambor & Keating

[57] ABSTRACT

A slider frame adapted to be slidably mounted on a semi-trailer having a pair of transversely spaced longitudinally extending body rails on the underside thereof. The slider frame includes a pair of longitudinally extending side rails of C-channel shape. Suspension hangers are fastened to the C-channel rails. A reinforcing pan is mounted in each C-channel rail above each suspension hanger. Tubular cross-members extend between the cross-rails and are attached to the reinforcing pans and the side rails. The reinforcing pans box-in and connect the C-channel rails to the suspension hangers.

4 Claims, 3 Drawing Sheets

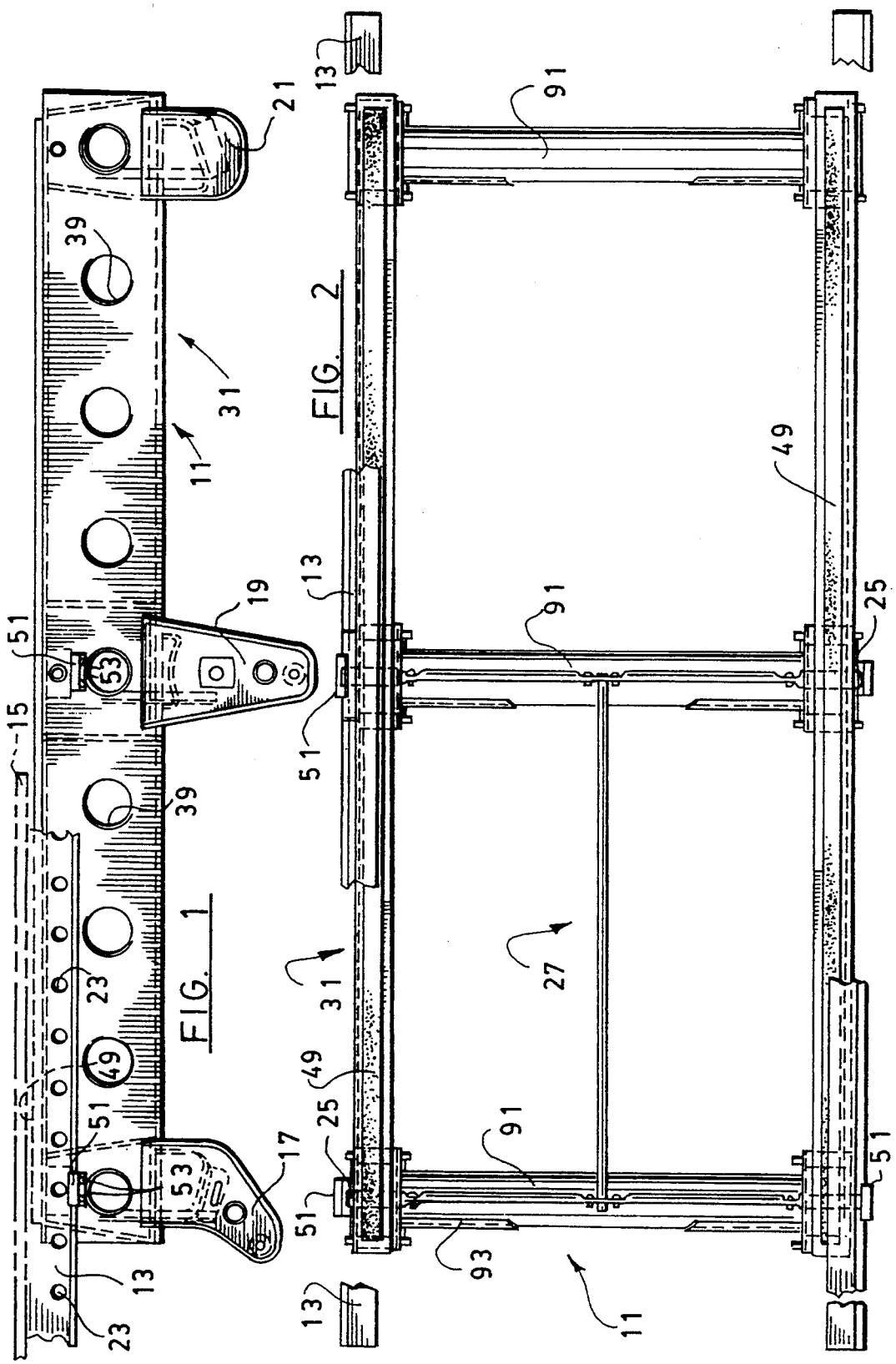

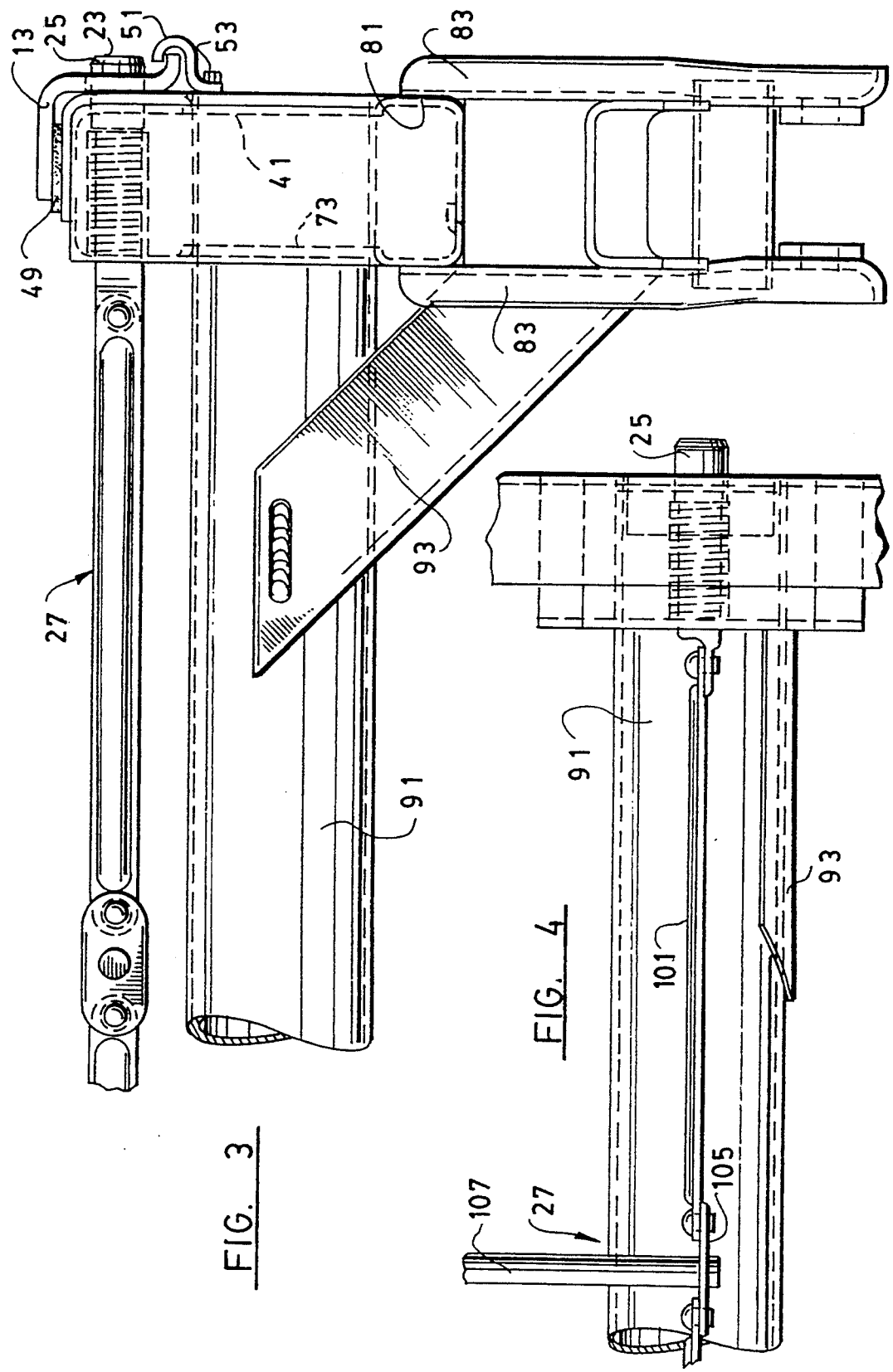

SLIDER SUSPENSION FOR SEMI-TRAILERS

BACKGROUND AND SUMMARY OF THE INVENTION

This invention is directed to a slider suspension system for a semi-trailer. A slider frame can be moved forwardly or rearwardly in relation to the tractor rear axles in order to maximize the load carrying capacity of the semi-trailer while complying with roadway weight laws.

A slider frame is usually sold with suspension hangers attached thereto, but can be sold without these hangers. When put in use, two axles are connected by means of springs and torque arms to the suspension hangers and the slider frame is attached to two elongated body rails which are welded to the underside of the trailer by means of a locking mechanism using cylindrical pins which positively attach the slider frame to pin receiving holes in the body rails.

The conventional slider frame assembly of the past has been constructed using two longitudinal G-channel side rails, three to five C-channel cross-members and many doublers, gussets, and cross-braces. The design of the frame with the conventional G-channel side rails provides a strong rigid connection to the tops of the suspension hangers which are attached to these channels. However, the G-channel side rails are relatively heavy and because of their shape trap road grime. Thus, their use causes both a weight penalty and corrosion problems. The use of C-channel cross-members is unsatisfactory because they are effectively rigid in only the direction dependent upon their orientation and geometry and are sensitive to the manner in which they are welded to the side rails. These welds often develop cracks and to correct the cracks specific welding techniques must be used and gussets and stiffeners must be installed thereby increasing the weight of the slider frame.

Accordingly, it is an object of this invention to provide a slider frame which is lighter yet stronger than present slider frames while using C-channel side rails which will not trap road grime.

Another object of this invention is a slider frame which uses tubular cross-members which can effectively translate loads in all directions and are torsionally rigid.

Another object of this invention is a slider frame utilizing C-channel side rails which are locally reinforced above each suspension hanger and provide a clean tie in between the side rails, suspension hangers and cross members.

Another object of this invention is a reinforcing pan for a suspension hanger which also mounts a tubular cross-member and rigidly connects it tied the side rails.

Another object of this invention is a slider frame which utilizes lightweight C-channel side rails by providing pan shaped box type reinforcing members at the suspension hangers.

Another object of this invention is a slider frame having C-channel side raises which have openings to receive tubular cross-members.

Other objects may be found in the following specification, claims and drawings.

BRIEF DESCRIPTION OF THE INVENTION

The invention is illustrated more or less diagrammatically in the following drawings wherein:

FIG. 1 is a side elevational view of the slider frame of this invention slidably mounted on elongated body rails under the floor of a semi-trailer with some parts broken away and others shown in phantom or dashed lines;

FIG. 2 is a top plan view of the slider frame of FIG. 1 with some parts broken away and hidden parts shown by dashed lines;

FIG. 3 is an enlarged partial end elevational view illustrating the attachment of a cross member to side rail and suspension hanger with hidden parts shown in dashed lines;

FIG. 4 is a partial top plan view of the apparatus shown in FIG. 3 of the drawings.

DESCRIPTION OF THE PREFERRED EMBODIMENT

Figure 5:
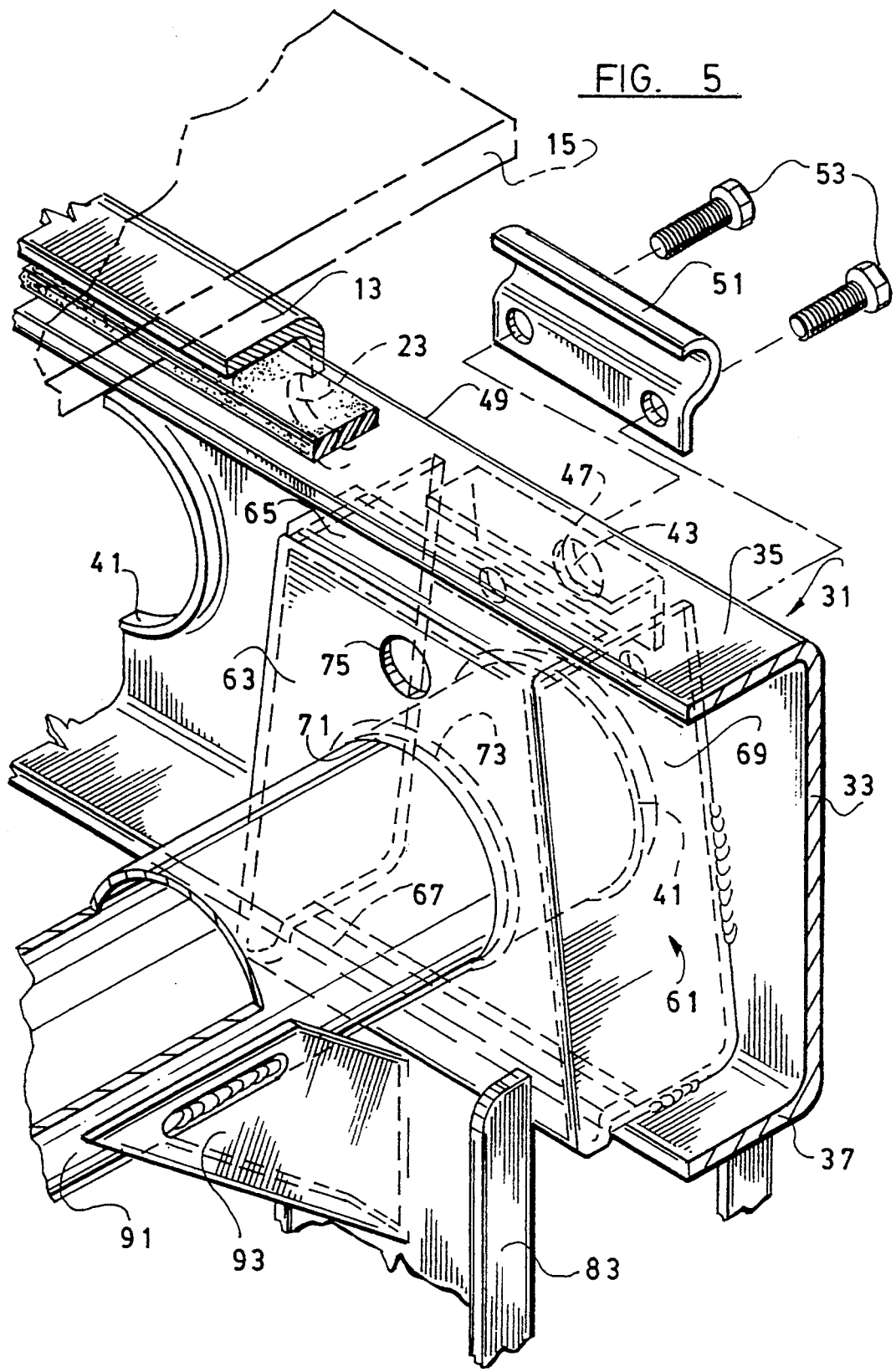
FIG. 5 is an enlarged partial perspective view showing the attachment of a reinforcing pan to the side rail and tubular cross-member with some parts omitted, some parts broken away, other parts shown in phantom line, and hidden parts shown in dashed lines.

FIG. 1 of the drawings shows a slider frame 11 of this invention adapted to be slidably mounted on body rails 13 attached to the undersurface of the floor 15 of a semi-trailer. As is customary, front suspension hangers 17, middle suspension hangers 19, and rear suspension hangers 21 are attached to the slider frame 11 to be connected with springs and torque arms to wheel axles all of which are conventional and are not shown. As is also conventional, the body rails 13 are formed with circular apertures 23 extending along the lengths thereof. These apertures are adapted to receive the cylindrical pins 25 of a conventional locking mechanism 27 as shown in FIGS. 2, 3 and 4 of the drawings.

The slider frame 11 of this invention is formed of C-channel side rails 31 which open inwardly of the frame. Each side rail has a web 33 connecting a top flange 35 and a bottom flange 37. A series of circular apertures 39 are formed in the web 33 at the middle thereof and extend the length of the side rails 31. Each circular aperture 39 has an integrally formed inwardly extending neck 41. A series of smaller circular apertures 43 for receiving the locking pins 25 are also formed in the web 33 above the circular apertures 39. A reinforcing angle iron 45 is located at each aperture 43 and has a circular aperture 47 formed therein which aligns with the aperture 43 to receive a locking pin 25. A slider pad 49 of UHMW polyethylene is positioned on the top of the flange 35 and underneath the body rail 13. Body rail clips 51 are attached to the side rails 31 by bolts 53 and engage the body rail 13 to hold the frame 11 to the body rails when the frame is repositioned.

A pan shaped reinforcing member 61 is provided at each of the suspension hangers 17, 19, and 21. The reinforcing members 61 installed at suspension hangers 17 and 21 are trapezoidal shaped while the members 61 installed at suspension hangers 19 are quadrilateral shaped. The trapezoidal shaped member will be described in detail in connection with the showing of FIG. 5 but it should be understood and appreciated that the quadrilateral member functions in the same manner although it is slightly different in shape. The reinforcing pan-shaped member 61 has a trapezoidal shaped wall 63 at the open inner face of the C-channel side rail 31. A top wall 65 of the pan fits under the top flange 35 of the side rail 31 while a stepped lip 67 at the bottom of the pan rests on the inside of the bottom flange 37. The pan 61 is formed with inclined side walls 69 which extend between the upper and lower flanges 35 and 37 of the side rail thus forming an enclosed box-like structure. The walls and lip are welded to the side rail 31. A circular aperture 71 is formed in the trapezoidal wall 63 of the pan and it has a short inwardly extending neck 73. A circular aperture 75 for the locking pin is also formed in the wall 63 above the larger circular aperture 71. It should be noted that the circular aperture 75 is offset laterally from a vertical center line through the larger aperture 71.

Each C-channel side rail 31 sits in a channel 81 formed by the side walls 83 of the hangers 17, 19, and 21 as shown most clearly in FIGS. 3 and 5 of the drawings. The reinforcing pan 61 engages and is attached to an inner side wall 83 of a hanger to box-in the connection between the hanger, the reinforcing pan and side rails.

A tubular cross-member 91 is located at each hanger with the tubular cross-member extending through the aperture 71 in the reinforcing pan and into the aperture 39 in the web 33 of the side rail 31. The tubular cross-member 91 is press fitted to the necks 73 of the apertures 71 of the reinforcing pans 61 and is welded to the C-channel side rails on the outside of the apertures 39. Cross braces 93 are welded between the side walls 83 of the hangers and the tubular cross members 91 as shown most clearly in FIGS. 3 and 4 of the drawings.

The locking pins 25 are connected to rods 101 which in turn are connected to cranks 105 which are rotated by a cross rod 107. As is conventional, the cross rod 107 is rotated by a pull lever which is not shown in the drawings.

We claim:

1. A slider frame adapted to be slidably mounted on a semi-trailer having a pair of transversely spaced longitudinally extending body rails on the underside thereof, said slider frame including:
    a pair of longitudinally extending side rails of C-channel shape,
    suspension hangers fastened to said C-channel rails,
    a reinforcing pan mounted in said C-channel rail above each suspension hanger,
    each reinforcing pan having at least one side wall located inside said C-channel rail,
    tubular cross members extending between said side rails and attached to said reinforcing pans and said side rails, and
    means to removably lock said slider frame to said body rails.

2. The slider frame of claim 1 in which said reinforcing pans are fastened to said C-channel rails and to said suspension hangers.

3. A slider frame adapted to be slidably mounted on a semi-trailer having a pair of transversely spaced longitudinally extending body rails on the underside thereof and having means to removably lock said slider frame to said body rails, said slider frame including:
    a pair of longitudinally extending side rails of C-channel shape,
    reinforcing pans mounted in said C-channel shaped side rails and adapted to be fastened to suspension hangers,
    tubular cross-members extending between said side rails and attached to said reinforcing pans and said side rails, said reinforcing pans interfitted with said C-channel side rails to provide an enclosed boxlike housing to receive said suspension hangers.

4. The slider frame of claim 3 in which said side rails have openings spaced along the length thereof, said tubular cross-members are seated in said openings and extend through similar openings in said reinforcing pans with said tubular cross-members welded to said side rails and press fitted to said reinforcing pans.

* * * * *